United States Patent [19]

Forestier et al.

[11] 4,451,110

[45] May 29, 1984

[54] TURBINE BEARING

[75] Inventors: Alexandre Forestier, Vaux le Penil; Alain M. J. Lardellier, Melun, both of France

[73] Assignee: S.N.E.C.M.A., Paris, France

[21] Appl. No.: 371,937

[22] Filed: Apr. 26, 1982

[30] Foreign Application Priority Data

Apr. 29, 1981 [FR] France ............... 81 08516

[51] Int. Cl.³ ............................................. F16C 27/00
[52] U.S. Cl. ................................................. 308/184 R
[58] Field of Search ........... 308/184 A, 184 R, 189 R, 308/207 R; 384/192, 215, 428

[56] References Cited

U.S. PATENT DOCUMENTS

| 2,875,001 | 2/1959 | Miller et al. | 308/233 X |
| 3,205,024 | 9/1965 | Morley et al. | 308/184 R |
| 3,332,726 | 7/1967 | Cooper | 308/184 R X |
| 3,485,538 | 12/1969 | Nogle et al. | 384/215 |
| 3,652,139 | 3/1972 | Memery | 308/187 |
| 4,084,861 | 4/1978 | Greenberg et al. | 308/184 R |

FOREIGN PATENT DOCUMENTS

| 809864 | 8/1951 | Fed. Rep. of Germany . |
| 1342674 | 9/1963 | France . |
| 1346653 | 11/1963 | France . |
| 1424222 | 11/1965 | France . |
| 2439331 | 10/1979 | France . |
| 1284602 | 8/1972 | United Kingdom . |
| 2058245 | 4/1981 | United Kingdom . |

Primary Examiner—Stuart S. Levy
Assistant Examiner—David Werner
Attorney, Agent, or Firm—Oblon, Fisher, Spivak, McClelland & Maier

[57] ABSTRACT

The outside retainer of the bearing is mounted at the end of a relatively elastic squirrel cage attached by a flange to a rigid support; the radial movements of the retainer are limited by an annular stop. In accordance with the invention, parts are arranged so as also to serve as stops for the circumferential and axial movements of the bearing.

3 Claims, 8 Drawing Figures

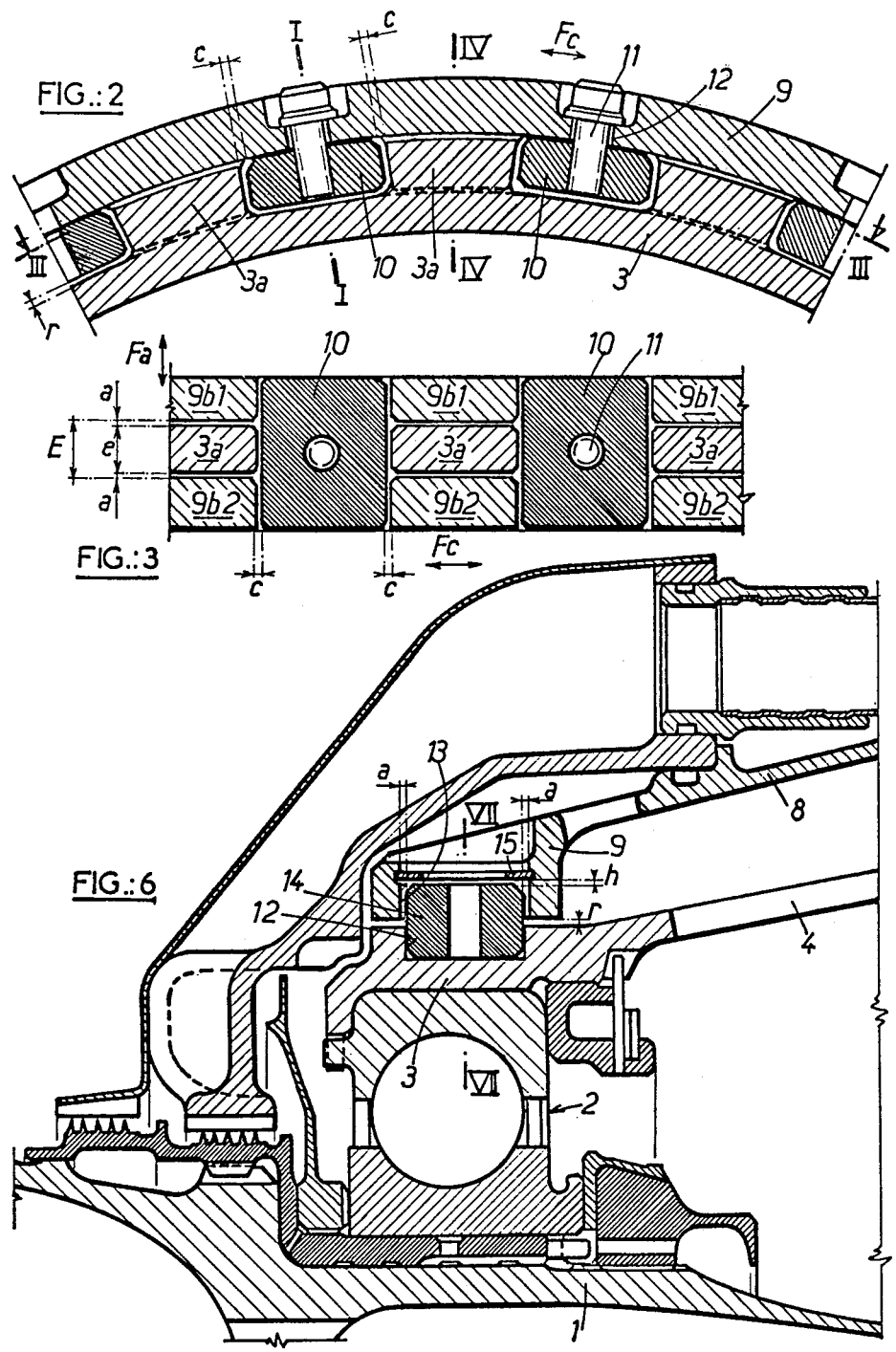

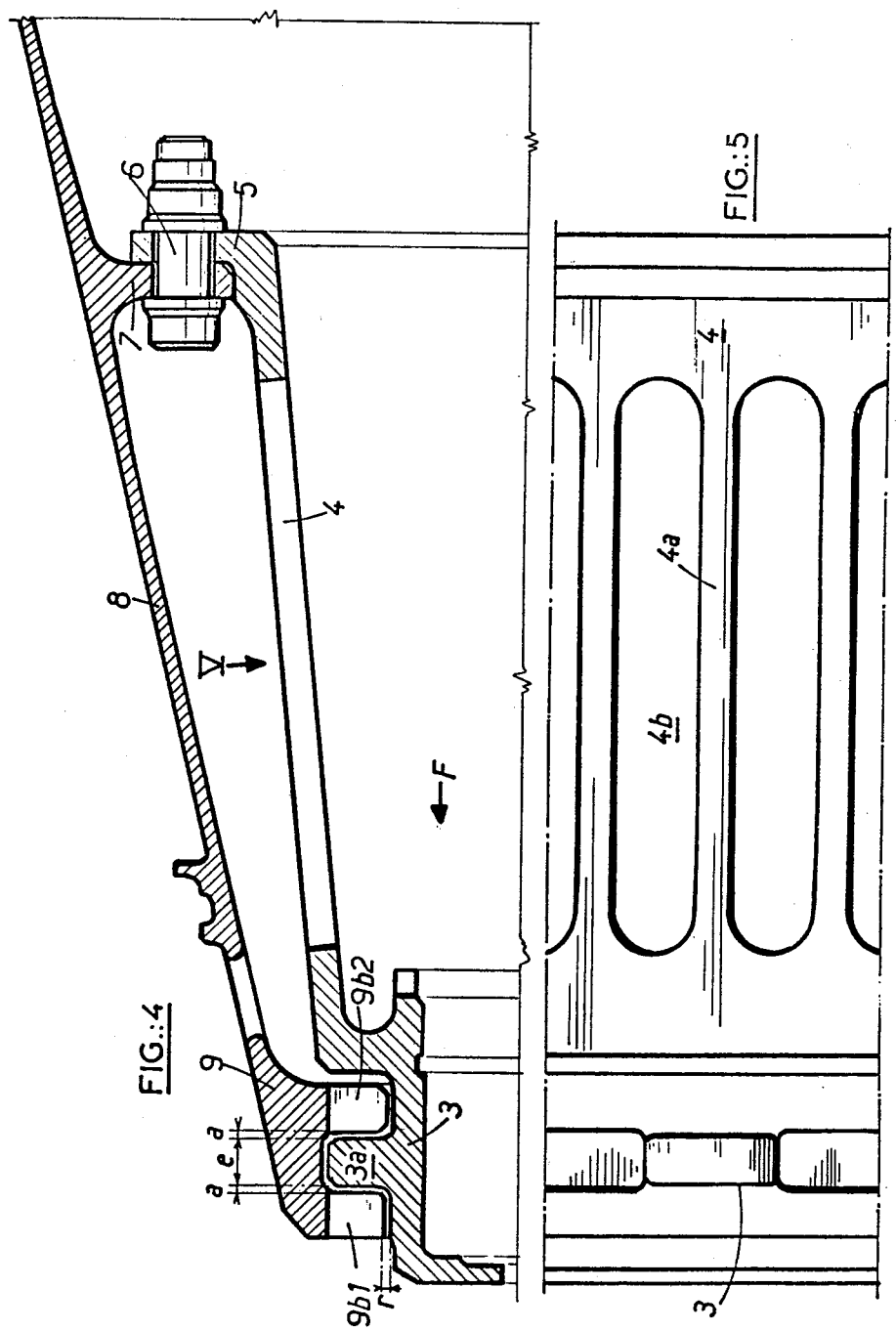

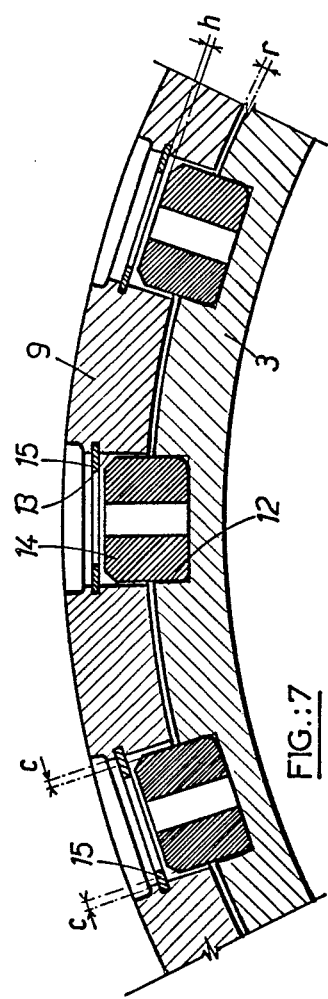
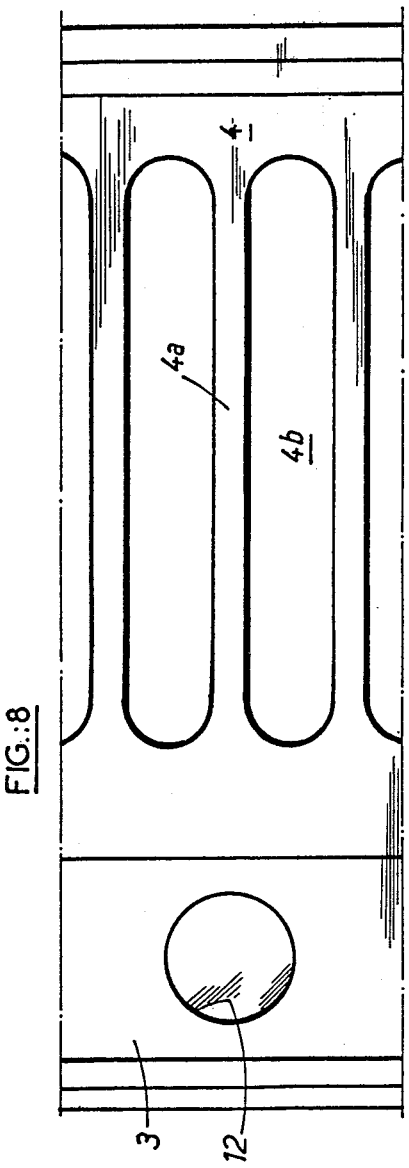

TURBINE BEARING

BACKGROUND OF THE INVENTION

1. Field of the Invention

This invention concerns a bearing, in particular for turbines.

2. Description of the Prior Art

When the rotors of certain turbines turn at high speeds, approaching their maximum, there is a risk of vibrations of great amplitude occurring if all the bearings of the rotor are attached extremely rigidly to their supports. Obviously, such vibrations could damage the turbine.

In an effort to solve this very serious problem, consideration has already been given to providing at least one of the bearings of the turbine motor with an elastic suspension.

French Pat. Nos. 1 342 674 and 1 346 653 held by Rolls-Royce Ltd. describe bearings each of which includes a squirrel cage, generally cylindrical in shape, which elastically connects a flange, used for rigid attachment to the bearing support, onto the outside race of the said bearing; furthermore, the outside race of the bearing is surrounded, with only slight play, by an annular stop, itself likewise unitary with the bearing support and situated so as to limit the radial movement of the bearing which is permitted by the elasticity of the squirrel cage connecting its outside race to the rigid support.

French Pat. No. 1 424 222 held by Rolls-Royce Ltd. describes an analogous bearing, in particular for gas turbines, in which devices are also provided so as to allow the radial stops to come into play only in critical operating circumstances.

French Pat. No. 2 439 331 held by the General Electric Co. describes a bearing for a rotating shaft, also including a squirrel cage with elastic bars whose radial vibrations may be dampened by suitable hydraulic shock absorbers.

The most evolved such elastic bearing mounts hence involve only stops arranged so as to limit the radial movement of the bearing. In the case of a turbine, however, there frequently are operating conditions for such an elastically suspended bearings for which the provision of radial stops is not sufficient. Indeed, while such radial stops suffice, for example, for limiting bearing movements under certain accidental conditions, such as the loss of one or more turbine rotor blades, it is also necessary to provide for stops to limit movements of the elastically mounted bearing in the circumferential and axial directions as well; for example in the event of binding of the bearing for an elastically mounted unit, sizable stresses are exerted in the circumferential direction which must be contained by appropriate stops; in like manner, in the event a turbine rotor breaks, its elastically mounted bearing is subjected to axial stresses directed frontwards or rearwards, which must also be contained under completely secure conditions.

SUMMARY OF THE INVENTION

The bearing, in particular for turbines, according to this invention is of the ype entailing the cylindrical or slightly conical squirrel cage elastically connected to a flange which is used for rigid mounting to the bearing support. The outside retainer of the said bearing is also surrounded with a slight amount of play by an annular stop made unitary with the support and arranged so as to limit the radial movements of the bearing. The outside retainer of the bearing and the annular stop are fitted to one another so as to also limit the circumferential and axial movement of the bearing.

Also arranged at the level of the annular stop designed to limit the radial movements of the bearing are the devices needed to limit its circumferential and axial movements; the stresses associated with such circumferential and axial movements are thus taken up in the same area, and virtually by the same piece, as the take-up of the stresses associated with its radial movement, which is extremely advantageous from the standpoint of the bearing's sizing, reduction of its mass, and its simplicity of mounting.

In one preferred embodiment of the bearing according to this invention, the outside retainer of the bearing and the annular stop each feature sets of radial teeth which interlock with a slight degree of play in order to limit the circumferential movements of the two parts, and at least one of the parts is also provided with axial stops arranged with slight play on either side so as to limit the axial movement of the two parts.

In another embodiment of the invention, pairs of chambers are arranged in the two opposing annular surfaces of the outside retainer of the bearing and the annular stop, and a coupling unit such as a pin with a high resistance to shearing is enclosed in each pair of chambers so as to have slight play, at least in the circumferential and axial directions of at least one of the two parts.

U.S. Pat. No. 3,652,139 held by J. P. Memmery describes a vibration dampener for bearings; this vibration dampener includes, in particular, two concentric annular rings fitted into one another and whose relative movements in the circumferential direction are limited by one or two radial pegs, one part of which, which is threaded for example, is fitted into a housing in the inside ring with a certain amount of play. This patent is different from the second embodiment of the present invention, in particular in that the rings of the shock dampener described in this patent are separate from the outside race of the corresponding bearing, on the one hand, and from an annular stop, on the other hand.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts through the several views, and wherein:

FIG. 2 is a partial cross-section view along line II—II of FIG. 1;

FIGS. 3 and 4 are partial cross-section views along lines III—III and IV—IV of FIG. 2;

FIG. 5 is a partial view in the direction of arrow V of FIG. 4;

FIG. 6 is a partial cross-section view in an axial plane of the second embodiment;

FIG. 7 is a partial cross-section view along line VII—VII of FIG. 6; and

FIG. 8 is a view roughly corresponding to that of FIG. 5 for the second embodiment.

DETAILED DESCRIPTION OF THE PREFERRED EMBDIMENTS

Figure 1:
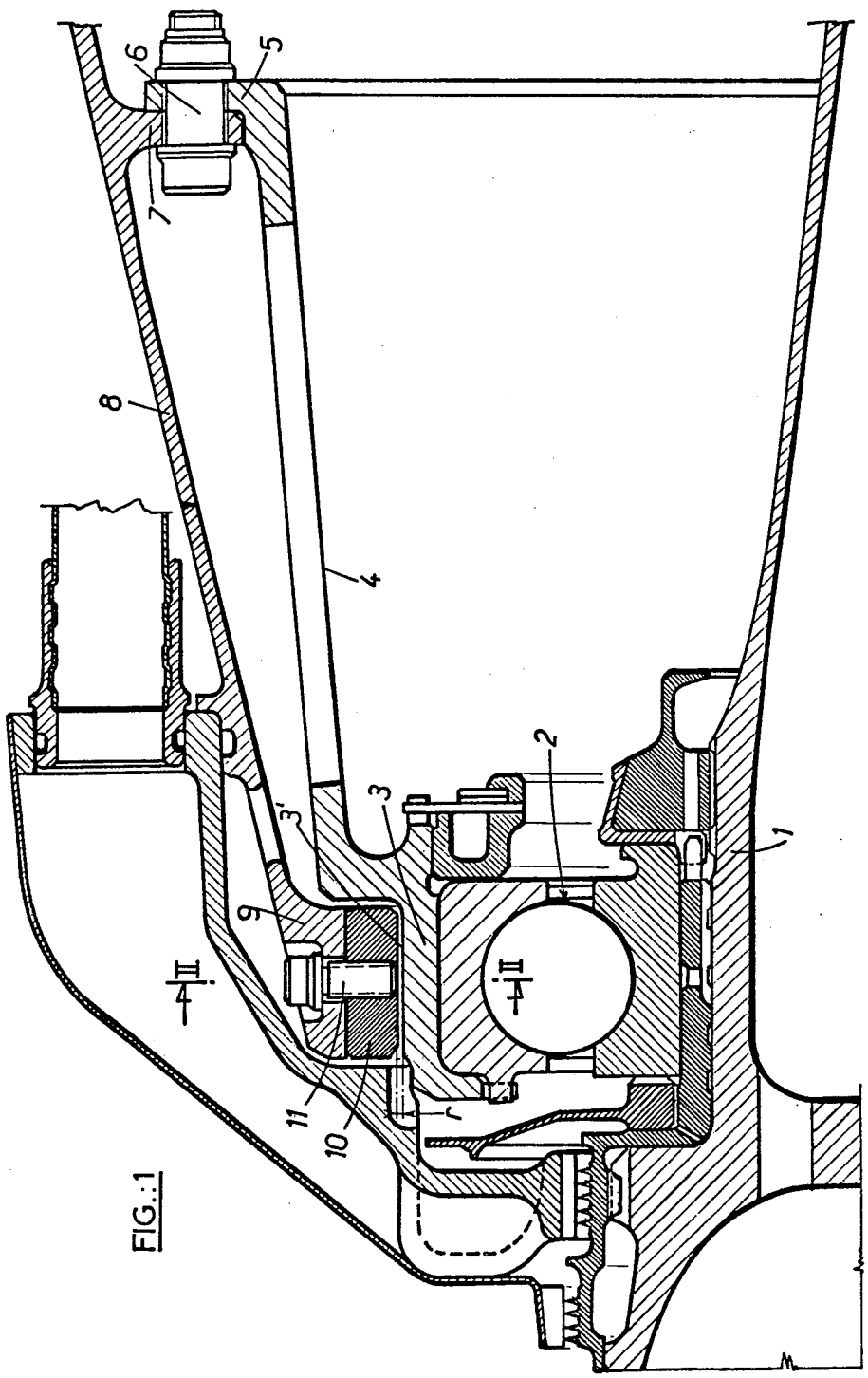
FIG. 1 is a partial cross-section view along an axial plane of the first embodiment.

In FIGS. 1 to 4, 1 designates a part of a turbine rotor on which the ball bearing 2 of a bearing is conventionally mounted, and hence not necessary to describe in detail. The outside retainer 3 of the bearing including the ball bearing 2 is connected elastically, by a squirrel cage 4 (also visible in FIG. 5), to a radial flange 5 turned toward the outside of the squirrel cage 4 and attached rigidly, by means of bolts such as 6, to a radial flange 7 of a rigid support 8, itself coaxial to the rotor 1 and the bearing 2. In the embodiment here shown, the squirrel cage is slightly conical, but is could also be cylindrical, whereas the coaxial support 8 is slightly more conical. In the event parts 3 to 8 are part of a high temperature bearing, in particular a turbine bearing, said parts are obviously made of materials able to resist the high temperatures to which they will be heated during operation of the turbine. These materials are generally metallic, at least for the squirrel cage. In the example illustrated, this squirrel cage is basically made of narrow bars 4a delimited by large, regularly spaced openings such as 4b (FIG. 4); as a variant, it could also be constructed basically of metallic rods, for example with a full circular cross section. Whatever the embodiment of the squirrel cage 4, it is essential that its size be such that it has a certain elasticity allowing for slight radial movements of the outside retainer 3 of the bearing with respect to its rigid support 8. At the level of the outside retainer 3 of the bearing, the rigid support 8 features an annular stop 9 which is virtually undeformable, due to being, for example molded with the support 8. As is clear from FIGS. 1 and 4, the annular stop 9 and the attached teeth 10 (FIG. 1) are shaped and sized so as to extend in close proximity to the outside annular surface 3' of the outside retainer 3 of the bearing, from which they remain separated, however, by an extremely slight distance r, in particular when the turbine rotor is at rest. This "radial play" r is determined such that the annular stop 9 and the teeth 10 attached thereto limit the possible radial movements of the bearings and its outside retainer 3 when, under particularly severe operating conditions, the bearing and its outside retainer 3 are subjected to intense radial stresses attributable, for example, to the loss of one or more turbine rotor blades.

In accordance with the present invention, the outside retainer 3 of the bearing and the annular stop 9 are made in such a way also as to limit the possible movement of the bearing in the circumferential and axial directions. In the case of this first embodiment, this result is obtained as follows: as visible in particular in the cross section views of FIGS. 2 and 3, the outside retainer 3 and the annular stop 9 respectively feature radial sets of teeth 3a and 10 which interlock with a slight amount of play c in order to limit the circumferential movements of the two parts 3 and 9, i.e., possible movements in the circumferential direction indicated by double arrows Fc of the bearing made unitary with the retainer 3, with respect to the fixed annular stop 9. In this embodiment, the teeth 10 of the circumferential stop portion of the annular stop 9 consist of parts independent of part 9, namely the aforementioned teeth 10, which are attachd to it by means of screws 11 inserted from the exterior through radial holes 12 in the said annular stop 9. Moreover, the annular stop 9 is also provided with axial stops arranged, with slight amounts of play a, on both sides of the teeth 3a of the outside retainer 3. In the embodiment considered, these axial stops are made up of two sets of teeth 9b1 and 9b2 (FIG. 3), which are identical to the set of teeth 3a on the outside retainer 3 and are separated by an axial interval $E = e + 2a$, where e designates the axial thickness of the teeth 3a. Finally, FIG. 3 shows that the "teeth" 10 of the annular stop 9 have an axial thickness equal to $E = 3e + 2a$, provided that the teeth of axial stop 9b1 and 9b2 of the annular stop 9 have the same axial width e as the teeth of the circumferential stop 3a of the outer race 3. Accordingly, the teeth 10 attached to annular stop 9 penetrate into the intervals between the successive teeth of each of the two sets of axial stop teeth 9b1 and 9b2 of the said annular stop 9.

To facilitate mounting, it is also advantageous for the circumferential width of the teeth set 3a to be a bit less than the circumferential width of the spaces between the teeth in teeth sets 9b1 and 9b2. In this case, the teeth 10 preferably have a circumferential width equal to that of the teeth in teeth sets 3a, 9b1 and 9b2. With such sizes, the squirrel cage 4 and the radial flange 5 must be mounted inside the support 8 prior to the attachment of the teeth 10 to the annular stop 9, as follows: the outside race 3 is moved toward the annular stop 9 in the direction of arrow F (FIG. 4) by circumferentially orienting the outside retainer 3, and cage 4 with which it is unitarily formed, in such a way that its teeth 3a are in the spaces in the set of teeth 9b2 of the stop 9; the axial movement of elements 3-5 in the direction of arrow F is stopped when the set of teeth 3a is roughly at the level of the space, with width $e + 2a$, between the two sets of teeth 9b1 and 9b2 of the stop 9, as shown in FIG. 4. The assembly of elements 3-5 are then made to pivot about its geometrical axis so as to align the teeth sets 3a, 9b1 and 9b2, as shown in FIG. 3. One can then engage the teeth 10 in the coincident spaces in the three sets of teeth and attach them to the stop 9 by engaging screws 11 from the outside through radial holes 12. It is then possible to fasten radial flange 5 to the flange 7 by means of screws 6.

In the event of bearing seizure, the outside retainer 3 is subjected to intense stresses in the circumferential direction of double arrow Fc (FIGS. 2 and 3), so that the right or lefts sides of its teeth 3a come up against the corresponding sides of the teeth 10, which has the effect of eliminating one of the two radial plays c which normally exists between each of the teeth 10 and the two neighboring teeth 3a. The circumferential stresses which the bearing transmits to its outside retainer 3 are taken up on the large contact surface between the side of each tooth 3a and the corresponding side of the neighboring tooth 10, which occurs better for a higher number of teeth so long as they are allowed to retain a sufficient thickness. Likewise, in the event of blade breakage, the bearing transmits intense axial stresses to the retainer 3, whose teeth 3a move in one of the directions of double arrow Fa (FIG. 3) until they come up against the corresponding set of teeth 9b1 or 9b2 of the annular stop 9, with the corresponding axial play a being eliminated. Again in this case, the axial stresses are taken up on large surfaces.

This first embodiment is suited to numerous variations, all of which come within the scope of the invention. It is not essential that the teeth 10 have an axial thickness greater than that of the teeth 3a of the external retainer 3; in particular, their axial width may be limited in such a way that they do not penetrate inside the spaces in teeth set 9b1; in this case, this teeth set 9b1 may be replaced by a continuous, radial annular rib, constituting one of the radial stops for the teeth set 3a of the outside retainer 3. In another variant, the teeth 10 are replaced by teeth molded with the annular stop 9 and identical to the teeth 3a of the outside ring 3, i.e. having the same axial width 3 (FIG. 3). In addition, the sets of teeth 9b1 and 9b2 may both be replaced by annular rings, one 9b1 being molded with the annular stop 9 and its aforementioned teeth, while the other annular ring, designed to replace the set of teeth 9b2 in its axial stop function, is made of two pieces independent of the annular stop 9, to which they may be attached by appropriate devices, analogous to the screws 11 (FIG. 2), for example. Of course, instead of being molded with the annular stop 9, the annular radial ring designed to replace the set of teeth 9b1 could also be independent of the annular ring 9 and attached to it by means of appropriate devices. These variants are economical to the extent they require the cutting or trimming of only two sets of teeth, instead of three in the case illustrated in FIG. 3; the mounting of the assembly of elements 3–5 in the support 8 is also facilitated and speeded up by the elimination of the teeth 10. Of course the axial stops, whether constituted by sets of teeth as in FIG. 3 or by continuous radial ribs, as in the variants just mentioned, could be unitary with the external retainer 3 instead of with the annular stop 9. The two axial stops or sets of stops could also be unitarily formed, one with the annular stop 9 and the other with the outside retainer 3.

The second embodiment of the invention, illustrated by way of example in FIGS. 6 to 8, differs from the first embodiment previously described only in the following respects: coinciding chambers 12 and 13 are arranged on the two opposing annular surfaces of the outside retainer 3 of the bearing 2 and of the annular stop 9, and a coupling piece, such as a pin 14 with a high resistance to shearing, is embedded in each pair of coinciding chambers 12–13 in such a way as to leave slight play at least in the circumferential and axial directions of at least one of the two parts 3 and 9.

In this embodiment, each pin 14 is fitted without play in the corresponding chamber 12 of the outside retainer 3, said chamber 12 being a blind hole with a transverse cross section adapted to that of the pin 14; on the other hand, each chamber 13 of the annular stop 9 crosses all the way through the latter, and its transverse cross section has, at least in the axial and circumferential directions, dimensions slightly greater than the corresponding dimensions of the transverse cross section of the pin 14; consequently, the pin has at least a circumferential play such as c (FIG. 7) and at least an axial play such as (FIG. 6) within the chamber 13. Finally, each pin 14 is prevented from radially emerging from the outermost opening of the corresponding chamber 13 by a stop piece such as a circle clip 15.

This second embodiment is likewise subject to numerous variations, all of them within the framework of the invention. These variants may relate in particular to the form and number of coupling pieces 14. In the case of the pins described earlier, they could equally well have plays a and c in the corresponding chambers 12 of the outside retainer 3. The circle clip 15 could be replaced by a plug of any kind; it is only important that between this obstructing device and the closest surface of the pin there remain a distance h equal at least to the radial play r between parts 3 and 9.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A bearing assembly comprising:
   a stationary support;
   an outside bearing retainer;
   a squirrel cage assembly elastically connecting said outside retainer to said support; and
   an annular stop unitarily formed with said support, said annular stop including a portion surrounding a portion of said outside retainer, with a predetermined radial clearance therebetween,
   wherein said portion of said outside retainer comprises first radial teeth on said outside retainer, wherein said portion of said stop comprises second radial teeth on said stop and circumferentially interlocking with said first radial teeth with a predetermined circumferential clearance therebetween, and wherein said portion of said stop further comprises two sets of third radial teeth, said sets being axially spaced by the axial thickness of said first radial teeth plus twice a predetermined axial clearance between said first and third radial teeth, and with said first radial teeth positioned between said sets, whereby circumferential and axial movements of said race are limited.

2. The bearing of claim 1 wherein said second radial teeth are positioned in the circumferential spaces between said first radial teeth, said second radial teeth having an axial thickness greater than said axial thickness of said first radial teeth plus twice said predetermined play.

3. The bearing of claims 1 or 2 wherein said second radial teeth form right parallelipipeds fixed to said annular stop.

* * * * *